United States Patent [19]

Valenzky et al.

[11] Patent Number: 4,707,139

[45] Date of Patent: Nov. 17, 1987

[54] CONTROL SYSTEM AND METHOD FOR CONTINUOUS MIXER WITH MOVING SURFACE DISCHARGE DEVICE

[75] Inventors: David Valenzky, Southbury, Conn.; Gary T. Markhart, Carlsbad, Calif.

[73] Assignee: Farrell Corporation, Ansonia, Conn.

[21] Appl. No.: 801,146

[22] Filed: Nov. 22, 1985

[51] Int. Cl.⁴ .............................................. B28C 7/16
[52] U.S. Cl. ..................................... 366/77; 366/132; 264/40.7; 425/145
[58] Field of Search .................... 366/142, 77, 79, 133, 366/132, 131; 264/40.7, 40.1; 425/135, 145, 204, 205, 207, 208

[56] References Cited

U.S. PATENT DOCUMENTS

| | | | |
|---|---|---|---|
| 3,674,397 | 7/1972 | Harris | 425/145 |
| 3,700,374 | 10/1972 | Matsuoka et al. | 366/77 |
| 3,704,972 | 12/1972 | Kneller et al. | 366/142 X |
| 3,728,056 | 4/1973 | Theysohn | 425/145 X |
| 3,799,719 | 3/1974 | Bonikowski et al. | 264/40.7 X |
| 3,921,963 | 11/1975 | Neff et al. | 366/79 X |
| 4,310,251 | 1/1982 | Scharer et al. | 366/77 |
| 4,328,549 | 5/1982 | Avery | 425/145 X |
| 4,501,498 | 2/1985 | McKelvey | 366/79 X |
| 4,550,002 | 10/1985 | Vhland et al. | 264/40.7 X |

FOREIGN PATENT DOCUMENTS

0024405 2/1983 Japan ...................................... 366/77

Primary Examiner—Stephen Marcus
Assistant Examiner—T. Graveline
Attorney, Agent, or Firm—Parmelee, Bollinger & Bramblett

[57] ABSTRACT

Disclosed is a system and method for controlling a continuous mixer having a gear pump discharge or an extruder screw discharge. The continuous mixer, which includes a charging orifice spaced apart from a discharge orifice, feeds material fed through the charging orifice through a melter/mixer. The material is caused to move through a chamber by one or more bladed rotors which are controlled by a motor. The discharge of this material through the mixer is controlled by the gear pump, and the RPM of the pump gears is controlled in relation to the torque produced by the motor which drives the bladed rotors. A change in torque produced by this motor will result in a change in the RPM of the pump gears, thereby maintaining the rotor torque and consequently the mixing energy exerted on the material being mixed in the mixer.

16 Claims, 5 Drawing Figures

CONTROL SYSTEM AND METHOD FOR CONTINUOUS MIXER WITH MOVING SURFACE DISCHARGE DEVICE

BACKGROUND OF THE INVENTION

This application relates in general to continuous mixers, and more particularly to a system and method of controlling a continuous mixer having a moving surface discharge device.

Continuous mixers for mixing plastic materials which include a mixing enclosure with interspaced entrance and exit openings and a mixing means are well known. In general, the mixing time of the material in the enclosure is dependent on the volume of material in the enclosure, which in turn is dependent in part on the rate at which material in the enclosure is moved out through the exit opening. By varying the size of the exit opening, the pressure required to push the material through the opening and the pressure on the material being mixed internally in the enclosure may be controlled.

In some situations, the restraint exercised by the exit opening is not satisfactory to exert the desired pressure on the material because of material characteristics of the mixing. Attempts to obtain a smoother action by use of walls having polished or lubricated surfaces have not been completely satisfactory either.

A smoother action is obtainable where the restraint to the flow of material discharged from the continuous mixer is provided by a moving surface discharge device in which one or more surfaces contact the material and move in the direction of the flow of material at controllable speeds. Movement at a speed initially slower than that of the flow when unimpeded restrains the flow and effects a back pressure on the flow. Then, by adjusting the speed so that the rate of feed into and from the mixer is substantially the same, this back pressure remains and is reflected back on the material being mixed in the mixer while moving through the mixer. Adjustment of the moving speed of the surface or surfaces adjusts the internal mixer pressure to give and maintain the pressure desired for the mixing operation involved. The speed can be made automatically responsive to the temperature of the mixing or discharging material, temperature being a function of the pressure on the material being mixed.

A screw-type extruder or a gear pump may be used to provide such a moving surface, provided that the rotative speed of the extruder screw, or pump gears, can be controlled. Continuous mixers utilizing a screw-type extruder and a gear pump are taught by U.S. Pat. No. 4,310,251 issued to Scharer et al.

In controlling the operation of a continuous mixer with a discharge device such as an extruder screw or gear pump, it is important that the operation of the starve fed continuous mixing device be synchronized with its closely coupled discharge device in order to achieve stable operation. It is also desirable to provide for the startup and shutdown of both pieces of equipment.

In U.S. Pat. No. 4,452,750 issued to Handwerk et al, an in-line melter/mixer-gear pump system is provided for the processing of synthetic, thermoplastic materials. The system employs the pressure between the melter/mixer and the gear pump as the controlling parameter which affects, in a proportional relationship, the speed of the gear pump, the energy transmitted to and the consequent temperature of the materials passing through said melter/mixer.

Such a control method has not proven to be of practical use due to the difficulty of developing relationships between the gear pump inlet pressure and the mixer energy input level. In fact, the relationship of pump speed to mixer power taught by Handwerk et al may be impossible. With the gear pump being a volumetric displacement device, it has a relatively constant output per revolution. It is, therefore, not possible to maintain an output rate of 900 lbs/hr over a gear pump speed range of 75 to 93 RPM. Either the material will back up in the mixer at the low end of the speed range (meaning the discharge rate from the system is no longer 900 lbs/hr) or the gear pump is running starved (incompletely filled) at the high end of the speed range, meaning that control of the mixer is no longer strictly due to the gear pump, but is now partially due to drag in the space between the mixer and the gear pump.

The Handwerk et al method of control also has the drawback that the pressure existing at mixer discharge is a derived variable, i.e. for the desired level of work input into the material being mixed, a certain pressure will exist. However, this pressure must be derived empirically by trial and error until the appropriate pressure for the desired level of work input in the mixer is achieved. As a result, such a system is difficult to use when starting up the machine.

It is therefore a principal object of the present invention to provide a system and method for controlling a mixer with a moving surface discharge device which can reliably control the speed of the discharge device and thereby control the energy transmitted to and the consequent temperature of materials passing through the melter/mixer.

A further object of the present invention is to provide a system and method for controlling a continuous mixer with a moving surface discharge device which does not require the use of a special measurement apparatus.

Still another object of the present invention is to provide a system and method for controlling a continuous mixer with a moving surface discharge device which can easily be adjusted to exert different pressures on the material being mixed.

Yet another object of the present invention is to provide a system and method for controlling a continuous mixer with a moving surface discharge device that operates as well during startup as during operation at the desired capacity.

SUMMARY OF THE INVENTION

According to the present invention, a system and method for controlling a continuous mixer having a gear pump discharge or an extruder screw discharge is provided. The continuous mixer includes a charging orifice and a discharge orifice with the two orifices being spaced apart. Material fed through the charging orifice passes through a melter/mixer with the movement of the material through the chamber of the mixer being caused by one or more bladed rotors driven by a connected motor. The discharge of this material through the mixer is controlled by the gear pump or the extruder screw, and the RPM of the pump gears or screw is controlled in relation to the torque produced by the motor which drives the bladed rotor or rotors. A change in torque produced by this motor will result in a change in the RPM of the pump gears, thereby adjusting the speed of discharge and consequently the pressure exerted on the material being mixed in the mixer.

These and other features and objects of the present invention will become apparent from the following detailed description which should be read in light of the accompanying drawings in which corresponding reference numerals represent corresponding parts throughout the several views.

BRIEF DESCRIPTION OF THE DRAWINGS

Appendix 1 is a listing of the computer instruction code for operating the mixer of the present invention.

DETAILED DESCRIPTION OF THE PREFERRD EMBODIMENT

Figure 1:
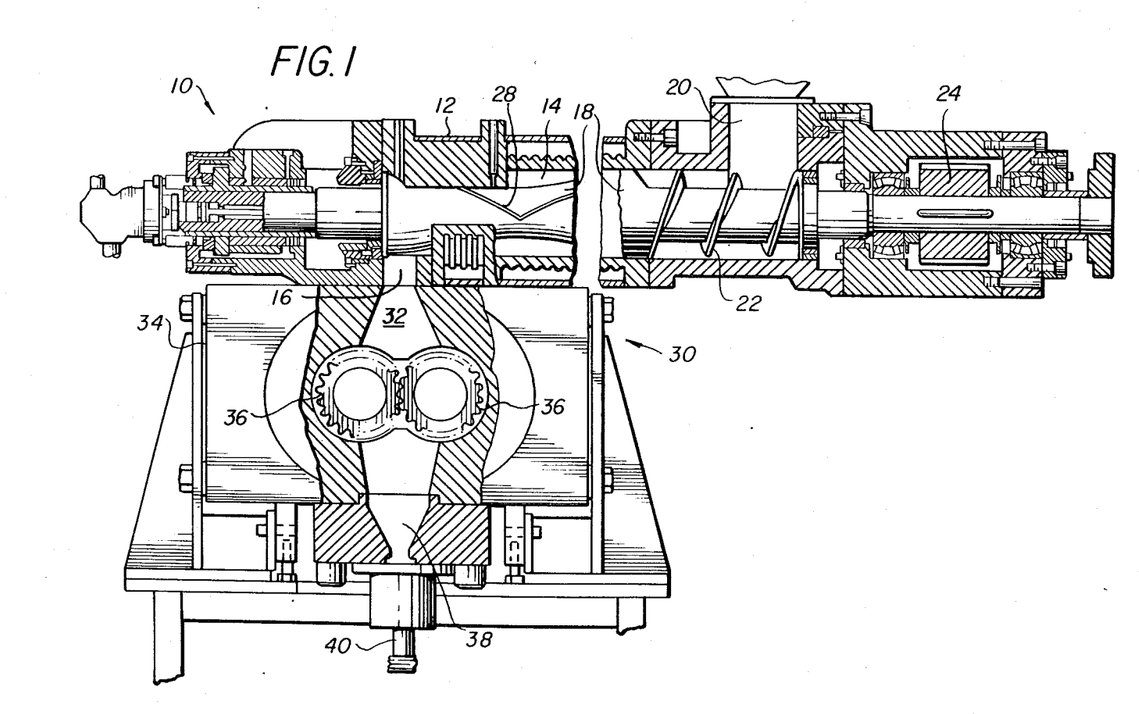
FIG. 1 is a cross sectional view of a continuous mixer having a moving surface discharge device controlled in accordance with the present invention.

The continuous mixer 10 of a continuous mixer system according to the present invention is that taught by U.S. Pat. No. 4,310,251, the specification of which is incorporated herein by reference. Briefly, as shown in FIG. 1, such a continuous mixer includes a mixer 10 and a discharge control device gear pump 30 which are closely coupled so that the operation of the gear pump can and does affect the operation of the continuous mixer as will be described below. In the illustrated embodiment the discharge control device is shown as a gear pump 30. An extruder screw discharge could easily be substituted for the gear pump 30.

The mixer 10 preferably includes a barrel 12 forming at least one and preferably two parallel, laterally interconnecting, cylindrical material working or mixing chambers 14 having at one end a common discharge orifice 16. Bladed rotors 18 are located in the chambers 14, and the material to be mixed is conveyed into the chambers 14 at an entrance location spaced from the discharge orifice 16. A vertical port 20 leads to conveying or feed screw blades 22 formed on the rotors 18 for pushing or feeding the material in the direction of the discharge orifice 16. The rotors 18 are intergeared for either opposite rotation or co-rotation by gears 24 and are supplied with a rotary drive system 26.

The exit opening or discharge orifice 16 opens transversely from the chambers 12 and at least mainly in overlapping relation with respect to portions of the blades 28 adjacent thereto. The discharge orifice 16 is connected directly and positively to inlet 32 of gear pump 30. The gear pump 30 comprises a housing 34 forming chambers in which the pump gears 36 are located. The gears 36 may be driven by a motor (not shown). The pump has an outlet 38 connected to an extrusion orifice 40.

In operation, the polymer material which is to be mixed, is fed continuously through vertical port 20 in the mixer 10, where the rotors 18 convey the material into the mixing chamber 14. The material is melted in this area before it exits through the discharge opening 16 and enters the close coupled gear pump inlet 32. This material, when discharged through the discharge orifice 16, is engaged by the gears 36. When the gears 36 are unpowered they should normally hold back the material discharged from the mixer because of the friction of the rotating parts. Once pressure is built up in the mixture to the desired value, the gear should be rotated to carry the mixed material away from the mixer at the same rate the material to be mixed is charged into the mixer.

During operation, a momentary slow-down of the gears serves to increase the mixer's internal pressure after which the screw or the gear should be returned to the rate matching the mixer's charging rate. A momentary speed-up of the screw or gears drops the pressure in the mixer. In all instances the material should be discharged from the mixer at substantially the rate at which the mixer is charged with material to be mixed, regardless of the selected mixer internal pressure.

According to the present invention, the internal pressure of the mixer 10 is controlled by adjusting the RPM of the gear pump through control based on the torque of the mixer motor. The amperage of the mixer drive motor is proportional to the actual torque produced by the motor, and this actual torque signal is monitored and compared with a target or required torque. The required torque is calculated from the following equation with known varibles:

Work Input = $(HP - hr)/lbm$

Production Rate = $lbm/hr$

RPM = $Rev/Min$ $$\text{Torque} = \frac{(\text{Work Input} \times \text{Production Rate})}{\text{RPM}} \times \text{Constant}$$

Under normal operation the mixing chamber of the continuous mixer is only partially filled. By adjusting the speed of the gear pump rotors 36, the level of fill inside the mixing chamber changes, affecting the operation of the mixture. An increase or decrease in the amount of material in the mixing chamber results in a corresponding increase or decrease of torque in the continuous mixer for a constant mixer rotor RPM and a constant feed rate. This also corresponds to an increase or decrease in energy.

Figure 2:
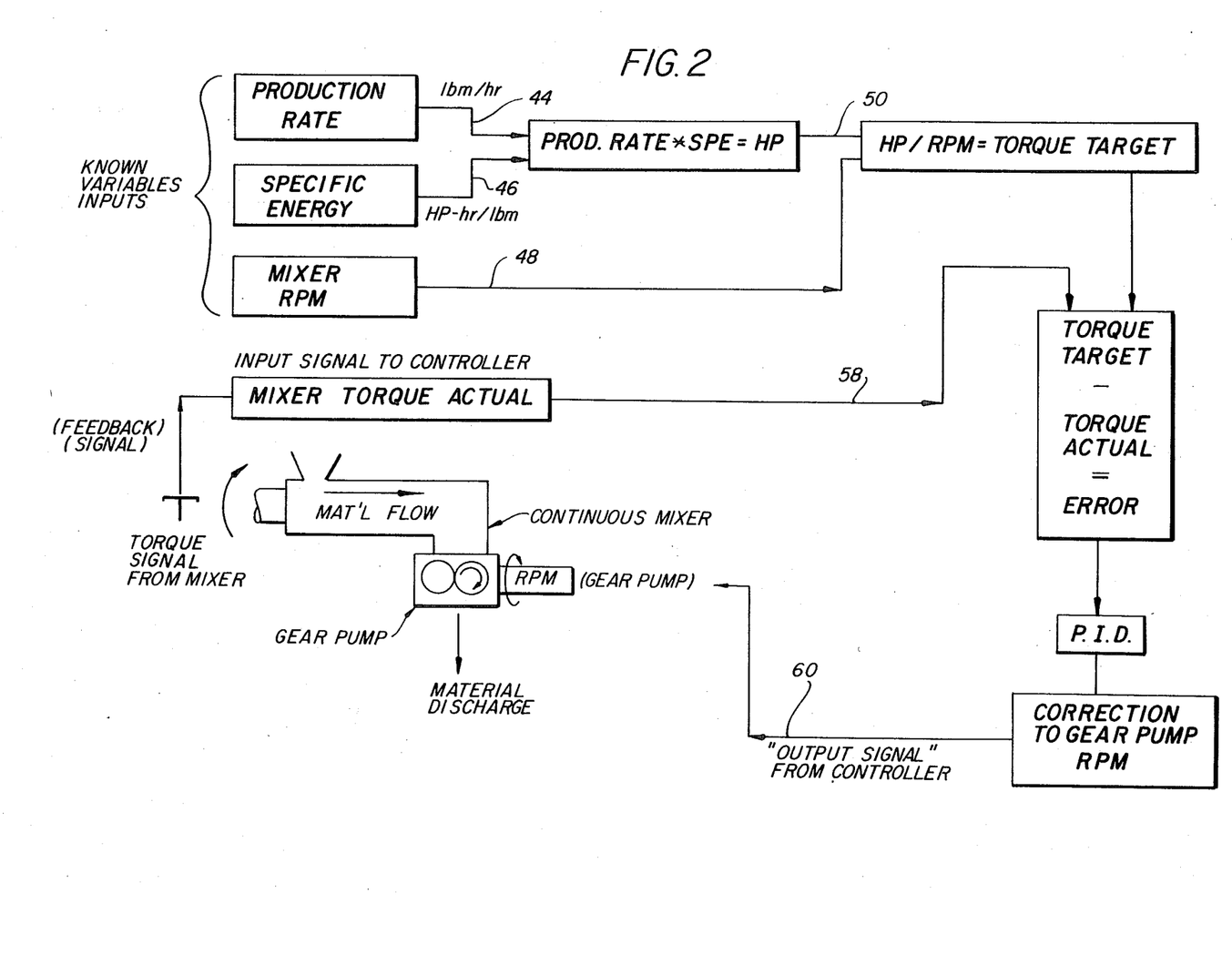
FIG. 2 is a diagram representation of the relationship of the input and output signals utilized by the system and method for controlling the operation of discharge device of the continuous mixer shown in FIG. 1.

To monitor and control the torque, a microprocessor is connected to the motor in a known fashion. As shown in FIG. 2, the microprocessor receives three inputs which can be entered by an operator or stored in memory and fetched by the microprocessor. These three input signals are the production rate 44 in lbm/hr, the specific energy 46 in HP-hr/lbm and the mixer RPM 48. A feedback signal 58 which is proportional to the actual torque on the mixer is also required. Since torque is proportional to the DC amperage on a DC motor and to the main motor horsepower in an AC motor/clutch type arrangement, these signals are used as the feedback signals. The processor output signal 60 is used to control the RPM of the pump gears.

In order to derive the process output signal 60, the controller multiplies the production rate times the specific energy to obtain a signal 50 representing horsepower. The controller divides this horsepower by the mixer RPM and obtains a value for torque. This calculated value for torque is the torque that the mixer must have in order to satisfy the three input variable requirements, i.e. the production rate, the specific energy and the mixer RPM.

The actual torque obtained from the feedback signal from the mixer is compared to the target torque (calculated from three known inputs) in the controller. The difference between these two values is considered an error which is placed into a standard velocity form of a proportional, integral and derivative control mode algorithm. The output of the PID loop minimizes the error by adjusting the speed or RPM of the gear pump. This change in speed of the gear pump results in a change in the actual torque of the mixer. Since the actual torque is measured by the controller through the use of the feedback signal, continuous adjustments are made to the gear pump RPM which minimizes the difference between actual and target torque.

This control strategy is most often used to maintain and/or adjust to different specific energy levels (the amount of energy applied to the material). Since the target torque is calculated by using specific energy, a change to this input by an operator will result in a change in the target torque. This change in target torque causes the controller to adjust the gear pump speed in order to match the actual and target torques.

Figure 3:
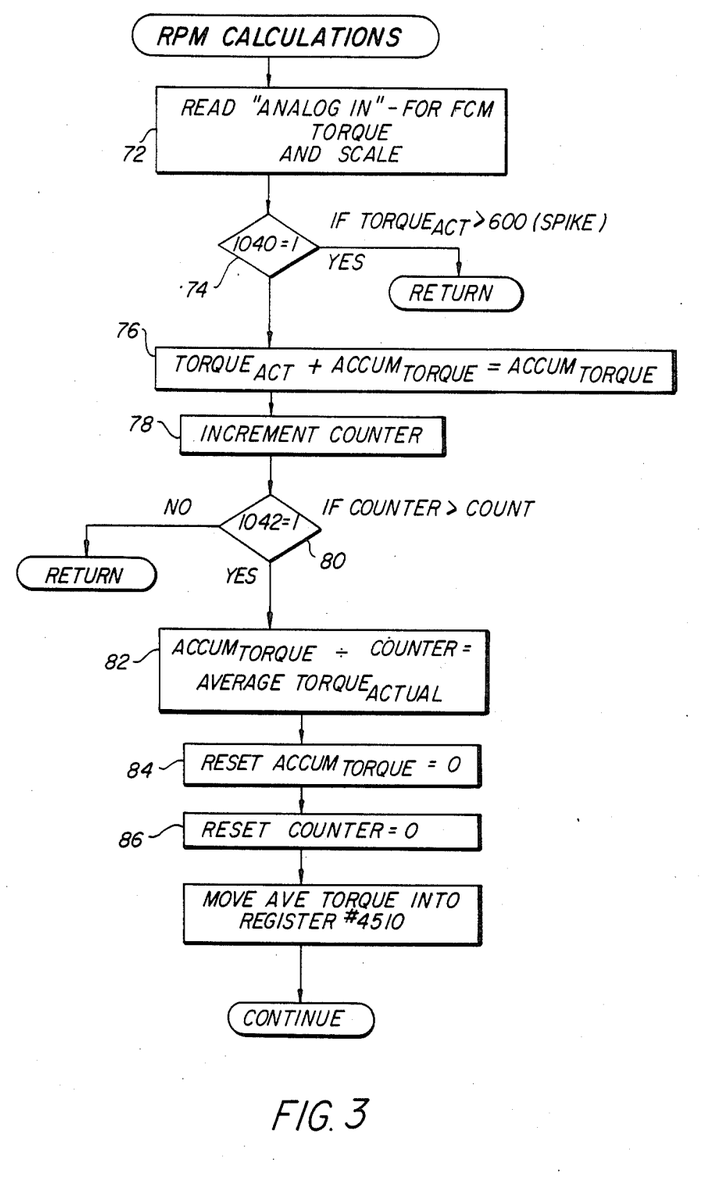
FIG. 3 is a flow diagram of the method for controlling a continuous mixer including a moving surface discharge device according to the present invention.
Figure 4:
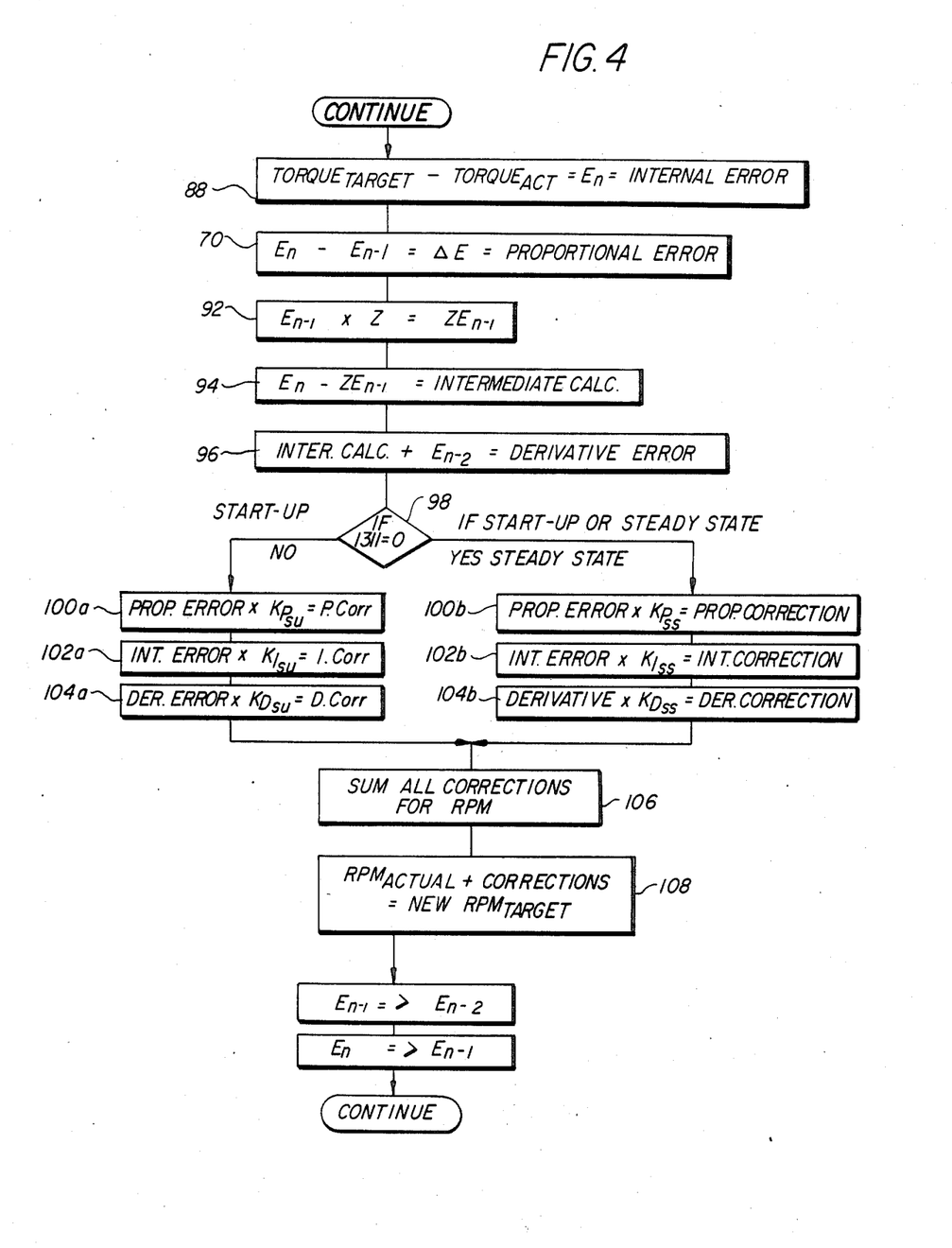
FIG. 4 is a continuation of the flow diagram of FIG. 3.
Figure 5:
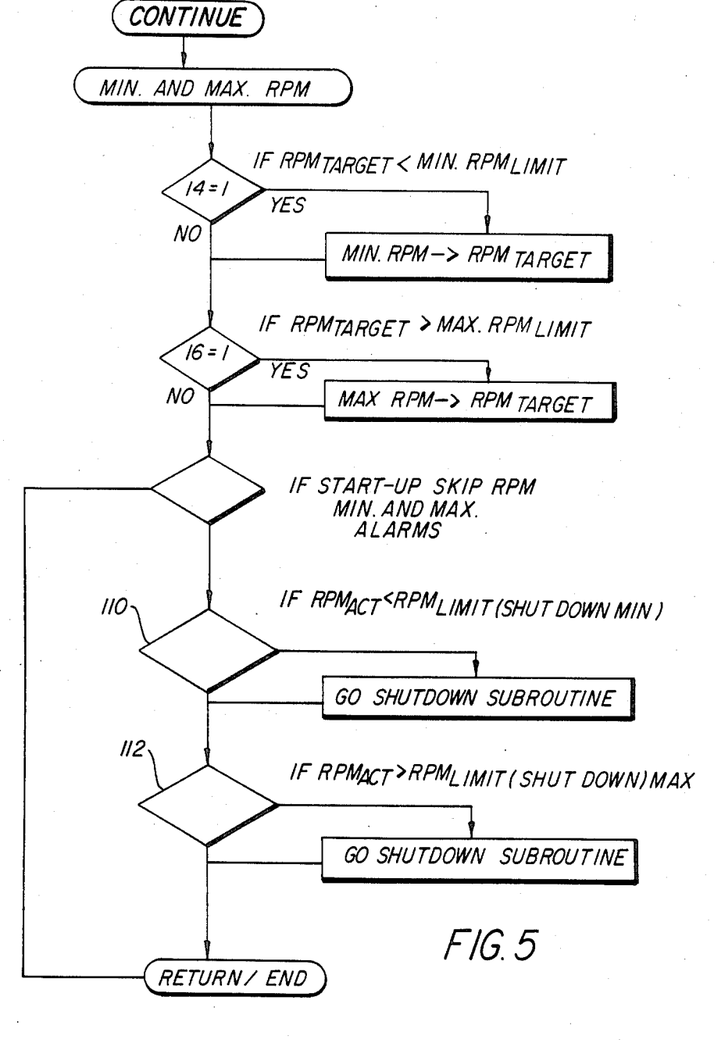
FIG. 5 is a continuation of the flow diagram of FIG. 4.

A specific embodiment of the control method set forth above is shown in FIGS. 3-5. The desired production rate, specific energy and mixer RPM are input to a processor, and a signal proportional to the actual torque of the mixer motor is fed to the processor in step 72. By means of an interrupt routine which is executed every 0.1 seconds, several readings of the signal proportional to the torque are made and scaled appropriately. In step 74, the torque signal read is examined to see whether the signal represents an electrical spike, and if so, further processing of that signal ceases. The actual torque signal read in step 72 is added during step 76 to an accumulated torque which represents a running total of torque values taken over a given time interval. A torque signal counter is incremented in step 78, and if the requisite number of actual torque values have been read to provide a reliable reading of the actual torque, step 80 initiates the processing of the torque signal as the feedback signal. If the requisite number of signals representing the actual torque have not been read, the control of the processor switches back to the main scan routine which scans for operator inputs.

Once the requisite number of actual torque values have been fed to the microprocessor, the average of the input torque values is computed in step 82. In order to process further signals, steps 84 and 86 reset both the accumulated torque and the counter to zero.

The proportional, integral and derivative (PID) control loop then takes over operation in order to equate the actual torque with the target torque. In step 88, the actual torque is subtracted from the stored target torque, and this integral error value $E_n$ is stored. The previous $E_n$, ($E_{n-1}$) is subtracted from $E_n$ in step 90 to arrive at a change in E which represents the proportional error. $E_{n-1}$ is doubled in step 92 and is then subtracted from $E_n$ in step 94 to arrive at an intermediate calculation which, in step 96 is then added to $E_{n-2}$ to arrive at the derivative error. Proportional, integral and derivative correction factors are then calculated depending on whether the torque value represents that of a start-up system or a steady state system. If the system is in the start-up mode, the proportional, integral and derivative errors are multiplied by appropriate constants for the start-up mode in steps 100a, 102a, 104a. Likewise, if the system is running in the steady state mode, appropriate constants are multiplied by the proportional, integral and derivative errors to arrive at the proportional, integral and derivative correction factors in steps 100b, 102b and 104b. Representative constants for the steady state operation are proportional gain: $-50$
derivative gain: $-5$
integral gain: $-10$.

Once the correction factors have been calculated, they are summed in step 106 to arrive at the appropriate RPM correction. This RPM correction factor is added to the actual RPM to arrive at the new target RPM in step 108. At that point, the new target RPM is compared to the minimum possible RPM in step 110 and to the maximum possible RPM in step 112. When either of these limits are detected, appropriate shut-down action is taken.

In a representative embodiment of the present invention, a Size 4 Farrel Continuous Mixer is connected to a Maag 70/70 Therminox gear pump. A Reliance Automate 35 microprocessor may be used to monitor the actual torque (D.C. amperage of a D.C. motor) and control the speed of the gear pump.

The foregoing invention has been described as utilizing the motor amperage to measure the rotor torque. While the motor amperage provides a convenient means for measuring motor torque with satisfactory accuracy, any other means for measuring motor torque may be substituted in the present invention. For example, a commercially available torque meter (such as a shaft with strain gages applied) may be inserted between the motor and the mixer, and such a device will actually provide a more accurate torque measurement.

While the foregoing invention has been described with reference to its preferred embodiments, various modifications and alterations will occur to those skilled in the art. In particular, while the present invention has been principally described with reference to a continuous mixer with a gear pump discharge, the control system and method are also applicable to a continuous mixer with an extruder screw discharge. Such variations and modifications are intended to fall within the scope of the appended claims.

APPENDIX 1

```
4004  REM      ****  FIRST UP    OPERATOR MODE SUBROUTINES  *************
4006  REM
4007  REM
4008  REM
4100  REM      ****  SUB 4105 PRINTS FORMAT FOR FCM/GP CONDITIONS
4101  REM
4102  REM
4105  PRINT    (200)  #176#034#176#021#022#001FARREL  SDFCM /GEAR PUMP PROCESS C(
4106  PRINT    (200)  NDITIONS#176#021#036#004ACTUAL      TARGET#176#021#001#005
4107  PRINT    (200)  1  RATE   (LB/HR)
```

```
4109  PRINT    (200) #176#021#001#0102  FCM SP.E.  (HP-HR/LB)          0.          0.
4110  PRINT    (200) #176#021#001#0123  FCM POWER  (HP) X 10
4111  PRINT    (200) #176#021#001#0144  FCM SPEED  (RPM)
4112  PRINT    (200) #176#021#001#0165  FCM TORQUE (FT-LB)
4113  PRINT    (200) #176#021#001#0206  FCM DISH.  (PSI) X 10
4114  PRINT    (200) #176#021#001#0227  G.P. SPEED (RPM)
4120  PRINT    (200) #176#021#001#024CONTROL LOOP CONSTANTS
4121  PRINT    (200) #176#021#001#026P          I         D
4122  PRINT    (200) #176#021@#004CONTROL MODE#176#021@#006A -- TORQUE
4123  PRINT    (200) #176#021@#007B -- PRESSURE
4124  PRINT    (200) #176#021@#010C -- INCREMENT#176#021E#011RATE
4199  RET
4200  REM      **** SUB 4205 PRINTS ACTUAL VALUES FCM/GP CONDITIOS
4205  PRINT    (200) #176#021 #006      #010#010#010#010
4206  PRINTV   (200) 4701     :2
4207  PRINT    (200) #176#021 #010
4208  PRINTV   (200) 4770     :3
4209  PRINT    (200) #176#021 #012      #176#021 #020
4210  PRINT    (200) #176#021 #012
4211  PRINTV   (200) 4730     :3
4215  PRINT    (200) #176#021 #016      #010#010#010#010
4216  PRINTV   (200) 4611     :1
4218  PRINT    (200) #176#021 #020      #010#010#010#010
4219  PRINTV   (200) 4411     :3
4225  DIV      (4426/4011)*(10**0 ) -> 4251
4226  MUL      (4251*4011)*(10**0 ) -> 4250
4227  SUB      4426 - 4250 -> 4252
4230  PRINT    (200) #176#021,#022.#010#010#010
4231  PRINTV   (200) 4251     :2
4232  PRINT    (200) #020
4233  PRINTV   (200) 4252     :2
4234  PRINT    (200)
4235  REM      LINE 4234 ABOVE PRINTS 3 BLANKS TO ERRASE ZERO FROM MINIS VALUE
4236  PRINTV   (200) 4256     :1
4240  IF       275      PRINT    (200) #176#021(#025ENTER NUMBER OR LETTER
4241  IF       275      PRINT    (200) OF TARGET VALUE#176#021(#026
4242  IF       275      PRINT    (200) TO BE MODIFIED-----ZERO TO EXIT
4243  IF       275      PUT P    0 -> 271
4399  RET
4400  REM      **** SUB 4405 PRINTS TARGET VALUES FCM/GP CONDITIONS
4405  PRINT    (200) #176#021+#006      #010#010#010#010
4406  PRINTV   (200) 4700     :3
4407  PRINT    (200) #176#021+#010
4408  PRINTV   (200) 4720     :3
4409  PRINT    (200) #176#021+#012      #010#010#010#010#010
4410  PRINTV   (200) 4721     :2
4411  PRINT    (200) #176#021+#014
4412  PRINTV   (200) 4723     :3
4418  IF       320      PRINTS (200) STR 5626
4419  IF       321      PRINTS (200) STR 5625
4420  PRINT    (200) #176#021+#016      #010#010#010#010
4421  PRINTV   (200) 4634     :3
4426  PRINT    (200) #176#021+#020
4427  PRINTV   (200) 4434     :3
4441  REM      LINE 4445 BLANKS ACTUAL PID PRINT LOCATIONS
4445  PRINT    (200) #176#021#003#026            #020#020          #020#020
4446  REM      ****** ABOVE PRINTS 3 GROUPS OF 7 BLANKS
4450  PRINT    (200) #176#021#003#026
4451  IF       320      PRINTV (200) 4441     :1
4452  IF       321      PRINTV (200) 4641     :1
4455  PRINT    (200) #176#021#014#026
4456  IF       320      PRINTV (200) 4442     :1
4457  IF       321      PRINTV (200) 4642     :1
4460  PRINT    (200) #176#021#025#026
4461  IF       320      PRINTV (200) 4443     :1
4462  IF       321      PRINTV (200) 4643     :1
4475  REM      NEXT UP PRINT ON/OFF RATE INC
4476  IF NOT   375      PRINT    (200) #176#021K#011OFF
4477  IF       375      PRINT    (200) #176#021K#011ON
4480  REM      NEXT UP 'Y' PRINT
4481  PRINT    (200) #176#021@#016Y -- RUNNING AVE#176#021E#017
4482  IF NOT   377      PRINT    (200) OFF
4483  IF       377      PRINT    (200) ON
```

```
4500  REM
4505  PRINT    (200) #176#021(#025ENTER NUMBER OR LETTER OF TARGET VALUE
4506  PRINT    (200) #176#021(#026TO BE MODIFIED-----ZERO TO EXIT
4599  RET
4700  REM
4701  REM
4702  REM      ************************************************
4703  REM      ****   LINE 4700 STARTS MATH SUBROUTINES    ************
4704  REM      ****   SUB 4705 FCM TARGET HP AND TORQUE
4705  MUL      (4701*4720)*(10**-2) -> 4721
4706  REM      IN ABOVE 4701 = FEED RATE IN LB/HR, 4720 = HP/LB X 100
4707  REM      THE ANSWER IN 4722 = HP TARGET X 10
4720  MUL      (4721*4726)*(10**-3) -> 4724
4721  REM         HP X 1500
4722  REM
4723  DIV      (4724/4723)*(10**2 ) -> 4634
4729  REM
4730  REM      ****   NEXT UP SUB 4735  --- FCM ACTUAL HP
4731  REM
4735  MUL      (4723*4611)*(10**-1) -> 4727
4736  REM         RPM   TORQUE
4737  DIV      (4727/4726)*(10**2 ) -> 4730
4738  REM         1500 CONSTANT      ACTUAL FCM HP   X   10
4740  DIV      (4730/4701)*(10**2 ) -> 4770
4741  REM      HP    LB/HR              HP/LB  X  1000
4745  RET
8277  REM      ************************************************
8278  REM      ************** PRIORITY 1 INTERRUPT ****************
8279  REM      ************************       ***********************
8280  REM      ************************************************
7002  SEQINT   IF 1001    , EXECUTE PRIORITY 1    INTERRUPT
7779  REM
7010  AIN      54   -> 4400
7011  REM                :::: UNSCALED G.P. FEED BACK PRESSURE
7014  DIV      (4400/4401)*(10**2 ) -> 4403
7015  ADD      4403 + 4404 -> 4405
7016  REM                :::: SCALED GEAR PUMP INLET PRESSURE
7017  REM
7018  REM
7025  REM      ********   FOLLOWING AVERAGES GEAR PUMP PRESSURE  -- VALUE
7026  REM      ********   IS INITIALLY DIVIDED BY 2, TO PREVENT REG. OVERFLOW
7027  REM      ********   AT HIGH PRESS. -- MUL. BY 2 AT END OF AVE ROUTINE
7028  REM
7030  DIV      (4405/4760)*(10**0 ) -> 4761
7032  ADD      4761 + 4406 -> 4406
7034  INC      4407
7035  CMP>     IF 4407 > 4410, PUT 1 -> 500
7040  IF NOT   500       GO TO #6430
7045  DIV      (4406/4407)*(10**0 ) -> 4411
7046  MUL      (4411*4760)*(10**0 ) -> 4411
7047  REM                     :::: AVE. G P INLET PRESS  X  10
7048  REM
7050  PUT D    0     -> 4406
7051  REM                :::: RESETS TOTALIZING PRESSURE TO   0
7055  PUT D    0     -> 4407
7056  REM                :::: RESETS AVERAGE COUNT TO   0
7057  REM      ***** NEXT LINE JUMPS PRESSURE PID WHEN IN TORQUE CONTROL ****
7059  REM      ********** NEXT UP PRESSURE CONTROL PID *********
7060  SUB      4411 - 4434 -> 4412
7061  REM                :::: PRESSURE ERROR  X  10
7062  REM      ***** NEXT UP -- IF 13 IS HIGH PID USES % ERROR  X  1000
7063  IF       13      DIV   (4412/4434)*(10**3 ) -> 4412
7065  SUB      4412 - 4413 -> 4414
7070  MUL      (4413*4402)*(10**0 ) -> 4415
7075  SUB      4412 - 4415 -> 4416
7080  ADD      4416 + 4420 -> 4417
7081  REM
7082  REM      4441, 4442, 4443  ::: RUN MODE P.I.D. CONSTANTS
7083  REM
7085  MUL      (4414*4441)*(10**-1) -> 4421
7090  MUL      (4412*4442)*(10**-1) -> 4422
7095  MUL      (4417*4443)*(10**-1) -> 4423
7096  REM
```

```
6010  ADD       4421 + 4422 -> 4424
6011  ADD       4424 + 4423 -> 4425
6012  IF        320       ADD    4426 + 4425 -> 4426
6013  REM.                        ::::   NEW G.P. RPM   PRESSURE CONTROL
6014  REM
6020  MOVR      4413 -> 4420
6021  MOVR      4412 -> 4413
6025  REM
6026  REM
6400  REM       ****************************************************************
6401  REM       ********* NEXT UP FCM TORQUE INPUT AND AVERAGING FOLLOWED
6402  REM       ********* BY DIRECT TORQUE CONTROL PID
6403  REM
6404  REM
6405  REM
6430  AIN       64   -> 4600
6431  DIV       (4600/4601)*(10**1 ) -> 4603
6432  ADD       4603 + 4604 -> 4605
6433  REM                         ::::  SCALED TORQUE F.B.
6434  REM
6435  REM       NEXT UP 2 SEC TORQUE AVE.
6440  ADD       4605 + 4606 -> 4606
6441  INC       4607
6442  CMP>      IF 4607 > 4610, PUT 1 -> 442
6443  IF NOT    442       GO TO  #6720
6444  DIV       (4606/4607)*(10**0 ) -> 4611
6445  REM                         ::::  AVE. TORQUE F.B.
6446  REM
6447  PUT D     0    -> 4606
6448  PUT D     0    -> 4607
6700  REM       0000000000000000000000000000000000000000000000000000000000
6701  REM       0000000000000000000000000000000000000000000000000000000000
6702  REM         NEXT UP RUNNING AV. MIXER TORQUE
6703  REM
6704  REM
6715  CMP<      IF 4605 < 4000, PUT 1 -> 1334
6716  IF        1334      PUT D  0        -> 4605
6720  ADD       4605 + 4130 -> 4130
6721  DIV       (4130/4132)*(10**0 ) -> 4131
6724  REM       ABOVE MOVES RUNNING AVE. INTO MAIN AVE. HOLDING REG.
6725  REM
6726  REM
6727  REM       NEXT UP RUNNING AVE. HOLD REG.
6728  REM
6729  SUB       4130 - 4173 -> 4130
6730  REM       ABOVE SUBS THE OLDEST VALUE FROM TOTALIZING REG.
6741  MOVR      4172 -> 4173
6742  MOVR      4171 -> 4172
6743  MOVR      4170 -> 4171
6744  MOVR      4167 -> 4170
6745  MOVR      4166 -> 4167
6746  MOVR      4165 -> 4166
6747  MOVR      4164 -> 4165
6748  MOVR      4163 -> 4164
6749  MOVR      4162 -> 4163
6750  REM       SKIP 10 FOR POSSABLE TEN POINT AVE. LOGIC
6761  MOVR      4161 -> 4162
6762  MOVR      4160 -> 4161
6763  MOVR      4157 -> 4160
6764  MOVR      4156 -> 4157
6765  MOVR      4155 -> 4156
6766  MOVR      4154 -> 4155
6767  MOVR      4153 -> 4154
6768  MOVR      4152 -> 4153
6769  MOVR      4151 -> 4152
6770  MOVR      4605 -> 4151
6780  REM       NEXT UP PICKS 2 SEC. OR RUNNING AVE.
6785  OR P      377       OR    442       -> 1733
6786  IF NOT    1733      GO TO #6493
6787  IF        377       MOVR  4131 -> 4611
6452  REM       ***** NEXT LINE JUMPS TORQUE PID WHEN IN PRESS. CONTROL *****
6454  REM       ******    START PID TO CONTROL TORQUE BY
6455  REM       ******       DIRECT G.P. RPM ADJUSTMENT
```

```
6790  INC    4254
6791  CMP>   IF  4254 > 4255,  PUT 1 -> 1333
6792  IF     1333         PUT D  0         -> 4254
6794  IF     1333         INC    4256
6457  REM             NEXT UP --  ACTUAL - TARGGET    PID CONSTANTS POSITIVE
6459  SUB    4611 - 4634 -> 4612
6460  REM
6461  REM    *******  NEXT UP  - IF 13 IS HIGH PID USES % ERROR  X  1000
6463  IF     13           DIV    (4612/4634)*(10**3 ) -> 4612
6466  SUB    4612 - 4613 -> 4614
6467  MUL    (4613*4402)*(10**0 ) -> 4615
6468  SUB    4612 - 4615 -> 4616
6469  ADD    4616 + 4620 -> 4617
6470  REM
6471  REM    4641,4642,4643   :::   TORQUE CONTROL PID CONSTANTS
6472  REM
6475  MUL    (4614*4641)*(10**0 ) -> 4621
6476  IF     1333         MUL    (4612*4642)*(10**-1)  -> 4622
6477  MUL    (4617*4643)*(10**-1) -> 4623
6478  REM
6479  REM
6484  ADD    4621 + 4622 -> 4624
6485  ADD    4624 + 4623 -> 4625
6486  IF     321    . ADD    4426 + 4625 -> 4426
6487  REM                  ::::   AUTO G.P. REF. RPM
6488  REM
6489  MOVR   4613 -> 4620
6490  MOVR   4612 -> 4613
6491  REM
6492  REM
6493  CMP<   IF  4426 < 4436,  PUT 1 -> 440
6494  IF     440          MOVR   4436 -> 4426
6495  CMP>   IF  4426 > 4437,  PUT 1 -> 441
6496  IF     441          MOVR   4437 -> 4426
6497  REM
6498  REM    ABOVE MIN /MAX  CHECKS FOR GEAR PUMP RPM
6499  REM
6500  REM    4436 = MIN = 0        4437 = MAX = CAL. BASED ON FEED RATE
6501  REM
6502  REM
6539  REM    *****  NEXT UP  SHIFT FOR MANUAL SPEED SET IF NOT IN AUTO
6541  IF NOT 3            MOVR   4464 -> 4426
6543  REM
6544  REM
6550  REM    NEXT LINES SCALE AND SEND OUT G.P. RPM SIGNAL
6551  SUB    4426 - 4465 -> 4466
6552  MUL    (4466*4476)*(10**-2) -> 4470
6553  AOUT   4470 -> 70
6600  RET

12492/835 BYTES USED
THE END
```

What is claimed is:

1. An improved apparatus for continuously processing thermoplastic material under controllable power, the apparatus including a barrel forming at least one substantially cylindrical material working chamber having a material charging orifice adjacent one end and a material discharge orifice adjacent the other end, means for substantially continuously feeding material to said chamber through said charging orifice at a controllable rate, a mixing rotor extending axially in said chamber, means for rotating said rotor, said rotor having axially extending blade portions, means on said rotor between said charging orifice and said blade portions for substantially continuously pushing material fed to said chamber toward said discharge orifice, a discharge control device having a moving surface and an inlet connecting to said discharge orifice for engaging moving material entering therein through said inlet, and means for adjusting said discharge control device at a variably controlled rate for applying a variable back pressure to the material fed through said orifice, the improvement comprising:
   means for measuring torque produced by the means for rotating said rotor;
   means for comparing said measured torque with a target torque and for generating an adjustment signal indicative of the difference between said measured torque and said target torque;
   means for adjusting a discharge rate of the discharge control device in response to said adjustment signal.

2. The improved apparatus of claim 1 wherein said means for rotating said rotor is a rotor drive motor and said means for measuring torque is a means for measuring amperage drawn by said rotor drive motor.

3. The improved apparatus of claim 1 wherein said means for comparing said measured torque and for generating an adjustment signal comprises:

means for the selecting a production rate, a specific energy applied to the material and a speed of operation for the mixer;

processor means for receiving a signal indicative of said measured torque produced by the means for rotating said rotor and for calculating said target torque from input signals indicative of said selected production rate, specific energy and speed, said processor means comparing said target torque to said measured torque produced by said rotor drive motor to provide a signal for controlling said discharge rate of the discharge control device.

4. The improved apparatus of claim 1 further comprising:

means for selecting a production rate, a specific energy applied to the material and a speed of operation for the mixer, processor means for receiving a signal representing the torque produced by the means for rotating said rotor, said processor means calculating said target from said selected production rate, specific energy and speed, said processor means also comparing said target torque to said measured torque produced by said rotor drive motor to provide a signal for controlling said discharge rate of the discharge control device.

5. The improved apparatus of claim 1 wherein said means for rotating said rotor includes a rotor drive motor and wherein said means for adjusting a discharge rate of said discharge control device comprises:

means for measuring actual amperage drawn by the rotor drive motor;

means for comparing said actual amperage drawn by said motor with a target amperage to be drawn by said motor;

means responsive to said comparing means for producing a control signal indicative of the difference between said actual amperage and said target amperage;

means for sending said control signal to the means for adjusting the rate of said discharge control device to adjust said adjusting means in response to said control signal to maintain said amperage drawn by the mixer motor at a chosen level.

6. An improved apparatus for continuously processing thermoplastic material under controllable power, the apparatus including a barrel forming at least one substantially cylindrical material working chamber having material charging orifice adjacent one end and a material discharge orifice adjacent the other end, means for substantially continuously feeding material to said chamber through said charging orifice at a controllable rate, a mixing motor extending axially in said chamber, means for rotating said rotor, said rotor having axially extending blade portions, means on said rotor between said charging orifice and said blade portions for substantially continuously pushing material fed to said chamber toward said discharge orifice, a discharge control device having a moving surface and an inlet connecting to said discharge orifice for engaging moving material entering therein through said inlet, and means for adjusting said discharge control device at a variably controlled rate for applying a variable back pressure to the material fed through said orifice, the improvement comprising:

means for monitoring the torque produced by the means for rotating said rotor and for adjusting a discharge rate of said discharge control device to maintain the torque produced by the means for rotating said rotor at a chosen target torque.

7. An improved apparatus for continuously processing thermoplastic material under controllable power, the apparatus including a barrel forming at least one substantially cylindrical material working chamber having material charging orifice adjacent one end and a material discharge orifice adjacent the other end, means for substantially continuously feeding material to said chamber through said charging orifice at a controllable rate, a mixing rotor extending axially in said chamber, a rotor drive motor, said rotor having axially extending blade portions, means on said rotor between said charging orifice and said blade portions for substantially continuously pushing material fed to said chamber toward said discharge orifice, a discharge control device having a moving surface and an inlet connecting to said discharge orifice for engaging moving material entering therein through said inlet, and means for adjusting said discharge control device at a variably controlled rate for applying a variable back pressure to the material fed through said orifice, the improvement comprising:

means for measuring actual amperage drawn by the rotor drive motor;

means for comparing said actual amperage drawn by the rotor drive motor with a target amperage to be drawn by said motor;

means responsive to said comparing means for producing a control signal indicative of the difference between said actual amperage and said target amperage;

means for sending said control signal to the means adjusting the rate of said discharge control device to adjust said adjusting means in response to said control signal to maintain, said amperage drawn by the rotor drive motor at a chosen level.

8. An apparatus for the continuous processing of thermoplastic material under controllable power comprising:

a barrel forming at least one substantially cylindrical material working chamber having a material charging orifice adjacent to one end and a material discharge orifice adjacent the other end, means for substantially continuously feeding material to said chamber through said charging orifice at a controllable rate;

a mixing rotor extending axially in said chamber and means for rotating said rotor, said rotor having axially extending blade portions means on said rotor between said charging orifice and said blade portions for substantially continuously pushing material fed to said chamber towards said discharge orifice;

a discharge control device having a moving surface and an inlet connected to said discharge orifice for engaging moving material entering therein through said inlet and means for adjusting said discharge control device at a variably controlled rate for applying a variable back pressure to the material fed through said orifice;

means for measuring torque produced by said means for rotating said rotor;

means for comparing said measured torque with a target torque and for generating an adjustment signal indicative of the difference between said measured torque and said target torque;

means for adjusting a discharge rate of the discharge control device in response to said adjustment signal.

9. The improved apparatus of claim 8 wherein said means for rotating said rotor is a rotor drive motor and said means for measuring torque is a means for measuring amperage drawn by said rotor drive motor.

10. The improved apparatus of claim 8 wherein said means for comparing said measured torque and generating or adjustment signal comprises:
  means for the selecting a production rate, a specific energy applied to the material and a speed of operation for the mixer;
  processor means for receiving a signal indicative of said measured torque produced by the means for rotating said rotor and for calculating said target torque from input signals indicative of said selected production rate, specific energy and speed, said processor means comparing said target torque to said measured torque produced by said rotor drive motor to provide a signal for controlling said discharge rate of the discharge control device.

11. An apparatus for the continuous processing of thermoplastic material under controllable power comprising:
  a barrel forming at least one substantially cylindrical material working chamber having a material charging orifice adjacent to one end and a material discharge orifice adjacent the other end,
  means for substantially continuously feeding material to said chamber through said charging orifice at a controllable rate;
  a mixing rotor extending axially in said chamber and means for rotating said rotor, said rotor having axially extending blade portions means on said rotor between said charging orifice and said blade portions for substantially continuously pushing material fed to said chamber towards said discharge orifice;
  a gear-type pump having an inlet connected to said discharge orifice for engaging moving material entering therein through said inlet and means for rotating said gear-type pump at a variably controlled rate for applying a variable back pressure to the material fed through said orifice, the improvement comprising:
  processor means for accepting input values of a production rate, a specific energy and a mixer RPM, said processor means calculating a horsepower value from the production rate and the specific energy, and then calculating a target torque from the mixer RPM and the calculated horsepower value;
  means for providing a feedback signal to said processor means indicative of actual torque produced by said means for rotating said rotor, said processor means comparing said feedback signal and said target torque and then generating a correction signal indicative of the difference between said target torque and said actual torque, said processor applying said correction signal to a proportional, integral and derivative control loop to produce an adjustment signal which is applied to said discharge control device to thereby adjust the gear pump RPM so as to maintain said actual torque equal to said target torque.

12. A method for continuously processing thermoplastic material under controllable power in a continuous mixer including a barrel forming at least one substantially cylindrical material working chamber having a material charging orifice adjacent one end and a material discharge orifice adjacent the other end, means for substantially continuously feeding material to said chamber through said charging orifice at a controllable rate, a mixing rotor extending axially in said chamber, means for rotating said rotor, said rotor having axially extending blade portions, means on said rotor between said charging orifice and said blade portions for substantially continuously pushing material fed to said chamber toward said discharge orifice, a discharge control device having a moving surface and an inlet connecting to said discharge orifice for engaging moving material entering therein through said inlet, and means for adjusting said discharge control device at a variably controlled rate for applying a variable back pressure to the material fed through said orifice, said method comprising the steps of:
  measuring torque produced by the means for rotating said rotor;
  comparing said measured torque with a target torque and generating an adjustment signal indicative of the difference between said measured torque and said target torque;
  adjusting a discharge rate of the discharge control device in response to said adjustment signal.

13. The method of claim 12 wherein said step of measuring torque comprises measuring amperage drawn by said means for rotating said rotor.

14. The method of claim 12 wherein said step of comparing said measured torque and generating an adjustment signal comprises the steps of:
  selecting a production rate, a specific energy applied to the material and a speed of operation for the mixer;
  providing a signal indicative of said measured torque produced by said means for rotating said rotor;
  calculating said target torque from input signals indicative of said selected production rate, specific energy and speed;
  comparing said target torque to said measured torque produced by said means for rotating said rotor to produce a signal for controlling said discharge rate of the discharge control device.

15. A method for continuously processing thermoplastic material under controllable power in a continuous mixer including a barrel forming at least one substantially cylindrical material working chamber having a material charging orifice adjacent one end and a material discharge orifice adjacent the other end, means for substantially continuously feeding material to said chamber through said charging orifice at a controllable rate, a mixing rotor extending axially in said chamber, means for rotating said rotor, said rotor having axially extending blade portions, means on said rotor between said charging orifice and said blade portions for substantially continuously pushing material fed to said chamber toward said discharge orifice, a discharge control device having a moving surface and an inlet connecting to said discharge orifice for engaging moving material entering therein through said inlet, and means for adjusting said discharge control device at a variably controlled rate for applying a variable back pressure to the material fed through said orifice, said method comprising the steps of:
  inputting values of a production rate, a specific energy and a mixer RPM to a processor means;
  caclutating a horsepower value from the production rate and the specific energy, and then calculating the target torque from said mixer RPM and said calculated horsepower value;
  providing a feedback signal to said processor means indicative of actual torque produced by said means for rotating said rotor;

comparing said feedback signal and said target torque and generating a correction signal indicative of the difference between said target torque and said actual torque;

applying said correction signal to a proportional, intergral and derivative control loop to produce an adjustment signal which is applied to said discharge control device to thereby adjust a discharge rate of said discharge control device so as to maintain said actual torque equal to said target torque.

16. A method for continuously processing thermoplastic material under controllable power in a continuous mixer including a barrel forming at least one substantially cylindrical material working chamber having a material charging orifice adjacent one end and a material discharge orifice adjacent the other end, means for substantially continuously feeding material to said chamber through said charging orifice at a controllable rate, a mixing rotor extending axially in said chamber, means for rotating said rotor, said rotor having axially extending blade portions, means on said rotor between said charging orifice and said blade portions for substantially continuously pushing material fed to said chamber toward said discharge orifice, a discharge control device having a moving surface and an inlet connecting to said discharge orifice for engaging moving material entering therein through said inlet, and means for adjusting said discharge control device at a variably controlled rate for applying a variable back pressure to the material fed through said orifice, said method comprising the steps of:

monitoring the torque produced by the means for rotating said rotor and adjusting a discharge rate of said discharge control device to maintain the torque produced by the means for rotating said rotor at a chosen target torque.

* * * * *